(No Model.)

H. M. SCARRITT.
VEHICLE AXLE NUT.

No. 590,912. Patented Sept. 28, 1897.

Witnesses

Inventor
Henry M. Scarritt
By H. B. Willson
Attorney

THE NORRIS PETERS CO., PHOTO-LITHO., WASHINGTON, D. C.

UNITED STATES PATENT OFFICE.

HENRY M. SCARRITT, OF CHICAGO, ILLINOIS.

VEHICLE-AXLE NUT.

SPECIFICATION forming part of Letters Patent No. 590,912, dated September 28, 1897.

Application filed February 10, 1897. Serial No. 622,847. (No model.)

*To all whom it may concern:*

Be it known that I, HENRY M. SCARRITT, a citizen of the United States, residing at Chicago, in the county of Cook and State of Illinois, have invented certain new and useful Improvements in Vehicle-Axles; and I do declare the following to be a full, clear, and exact description of the invention, such as will enable others skilled in the art to which it appertains to make and use the same.

My invention relates to vehicle-axles, and more particularly to means for securing the nut thereon against accidental removal.

The object of the invention is to provide a device of this character which shall be simple of construction, durable in use, and comparatively inexpensive of production.

With this object in view the invention consists of certain features of construction and combination of parts, which will be hereinafter fully described, and particularly pointed out in the claim.

Figure 1:
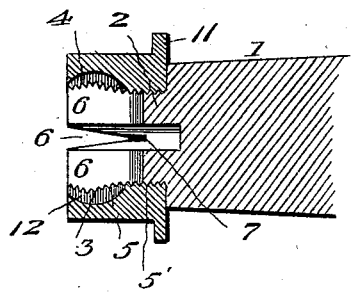
Figure 2:
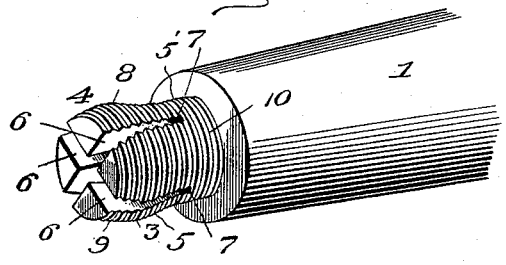

In the accompanying drawings, Figure 1 is a longitudinal sectional view through the end of an axle, showing the nut in locked adjustment; and Fig. 2 is a detail perspective view of the end of the axle.

In the drawings, 1 denotes the end of the axle, provided with a nut extension 2, which is turned with a swell 3, formed by the forward incline 4 and the rear incline 5. At the rear of the inclined portion 5 the extension is perfectly straight, as shown at 5'. The outer end of the extension is provided with V-shaped slits 6, crossing each other and terminating in narrow slits 7. The extension is provided with screw-threads extending from one end to the other, and for clearness of description I will designate them "compression," "check," and "plain" threads.

The compression-threads are designated by the numeral 8, the check-threads by the numeral 9, and the plain threads by the numeral 10, the purpose of which will presently appear.

11 denotes a nut the threads of which do not extend all the way through the same. An annular recess or chamber 12 is formed in the nut and is adapted to receive the swell of the extension.

In use, after the wheel has been placed on the axle, the nut is engaged with the nut extension and screwed home. In engaging the nut with the extension it will be noticed that as the nut is screwed upon the inclined portion 4 the jaws of the extension are compressed and the nut continues until it passes the swell 3 and the incline 5 and reaches the straight portion of the extension. A reverse movement of the nut will now be resisted by the check-threads, which, with the swell and compression threads, have sprung outwardly into the annular recess in the nut. By applying a strong wrench power to the nut it may be unscrewed, but it is impossible for it to work loose accidentally.

Having thus fully described my invention, what I claim as new and useful, and desire to secure by Letters Patent of the United States, is—

A nut extension having a straight portion and reversely-inclined portions forming a swell, said extension being provided with plain, check and compression threads, and being radially split to form spring-jaws, and a nut adapted to said threads and provided with an annular chamber of greater area than the bore of the nut, to receive the inner ends of said jaws when released from compression, substantially as set forth.

In testimony whereof I hereunto affix my signature in presence of two witnesses.

HENRY M. SCARRITT.

Witnesses:
A. W. MARTIN,
J. DIAMOND.